US012303914B2

(12) United States Patent
Molinari et al.

(10) Patent No.: US 12,303,914 B2
(45) Date of Patent: May 20, 2025

(54) TIRE PARTICULATE COLLECTION SYSTEM

(71) Applicant: Robert Bosch GmbH, Stuttgart (DE)

(72) Inventors: Nicola Molinari, Cambridge, MA (US); Mordechai Kornbluth, Brighton, MA (US); Daniil Kitchaev, Brookline, MA (US); Karim Gadelrab, Boston, MA (US); Charles Tuffile, Swansea, MA (US)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 18/372,487

(22) Filed: Sep. 25, 2023

(65) Prior Publication Data

US 2025/0099979 A1 Mar. 27, 2025

(51) Int. Cl.
*B03C 7/02* (2006.01)
*B07B 1/04* (2006.01)

(52) U.S. Cl.
CPC . *B03C 7/02* (2013.01); *B07B 1/04* (2013.01)

(58) Field of Classification Search
CPC .................................... B03C 7/02; B07B 1/04
See application file for complete search history.

(56) References Cited

U.S. PATENT DOCUMENTS

2024/0261797 A1* 8/2024 Engelke .................... B03C 3/36

FOREIGN PATENT DOCUMENTS

KR 102136771 B1 * 7/2020
WO 2021152331 A1 8/2021

* cited by examiner

*Primary Examiner* — Jacob S. Scott
*Assistant Examiner* — Miraj T. Patel
(74) *Attorney, Agent, or Firm* — Dickinson Wright PLLC

(57) ABSTRACT

The present disclosure is directed to a tire particulate collection device for a motor vehicle. A tire particulate collection device is disclosed having at least a first chamber which includes a first grate and, a first collection compartment where tire particulate or other debris are collected. The device also comprises a last chamber having a collection plate. The last chamber also has a last collection compartment that allows entry of tire particulate matter into the last collection compartment. During vehicle operation, the tire particulate matter is accelerated through the device due to an applied electric field induced by providing an electrical charge to at least the first grate and collection plate. The tire particulate is then collected within the device.

17 Claims, 4 Drawing Sheets

TIRE PARTICULATE COLLECTION SYSTEM

TECHNICAL FIELD

The present disclosure relates to devices and systems for collection of particulate matter or debris which is generated from tires during the course of operation of motor vehicles.

BACKGROUND

Microplastic pollution is a key environmental challenge, and microplastics are a major source of plastic pollution globally. Surprising sources of microplastic pollution that have been commonly overlooked are the tires of motor vehicles. During normal operation of a vehicle, when a tire accelerates or breaks, the tire sheds rubber particulates. These particulates can disperse in the air and significantly affect the air quality.

Electrification of the transport industry has contributed to the decline of exhaust pipe pollutants, but conversely has significantly increased the weight of the vehicles due to the heavy batteries. This has led to increased friction during vehicle motion and thus greater tire wear particulate emissions. Additionally but not less importantly, such rubber particulate could be recycled in different ways depending on the size and composition of the shed rubber. Example of re-usability of tire particulate range from bitumen (asphalt), to shoe soles, to sound-proofing materials, depending on size and composition.

Strategies and systems to collect tire particulate matter are not currently well developed. Particulate collection away from the point source is not feasible due to the low concentration and strong dependence on wind patterns. Therefore, solutions need to be implemented near the source of the particulates, i.e. the vehicle tires. The main flaws with current approaches include build-up of particulates in current devices, which decreases the effectiveness of the device and increases the amount of particulates left dispersed in the air. Due to reasons relating to cost, complexity and maintenance, a mechanical cleaning of these components having built-up particulates is highly undesirable. Furthermore, localized collection points are not enough with respect to efficiency, as this necessitates frequent service or maintenance of these collection points. A more efficient and long-term solution is required, which can reduce the burden of having to perform frequent maintenance and collection.

SUMMARY

The present disclosure is directed to a tire particulate collection device for a motor vehicle. Various embodiments of the devices disclosed herein overcome current design draw backs of existing solutions, including unwanted particulate build-up on collection plates. Furthermore, the embodiments disclosed provide devices and means for long-term in-vehicle storage solution system which remains unresolved in the current market.

A tire particulate collection device is disclosed which is placed in proximity to a vehicle tire. The device comprises at least a first chamber which includes a first grate a first collection compartment where tire particulate or other debris are collected. The first collection compartment has a first opening which allows for tire particulate or debris to enter to ultimately be collected in the first collection compartment. The device further comprises a last chamber having a collection plate. The last chamber also has a last collection compartment, with a last opening section that allows entry of tire particulate matter into the last collection compartment.

During operation of the motor vehicle, electrically charged particulate matter is discharged or accelerated from the moving tire. This particulate matter enters and is accelerated through the device, aided in its acceleration by an electric field created due to an applied electrical charge on the first grate and/or collection plate within the device. Particulate matter is then collected at least in the first collection compartment or the last collection compartment.

Selected Definitions and Nomenclature

The term “particulate matter”, as used herein, refers to all types of particulates, which can be accelerated by a vehicle tire and includes components of the tire itself, and also other particulates present on the roadway or being released by operation of the motor vehicle. As used herein, “particulate matter” includes debris, rocks, soil, water, sediments, salts, rubber particulates from tires, and other motor vehicle related debris.

The term “tire particulate matter” can include particulate matter shed from the tire of a vehicle, or particulates which are accelerated by the tire but did not originate from the tire, such as other road particulates or motor vehicle particulates. Throughout this disclosure the term “particulate matter” or “electrically charged particulate matter” or “tire particulates” or “tire particulate matter” can be used interchangeably to refer to the same components.

The terms “grates” or, “electrically charged grates”, refer to the same components and can be used interchangeably throughout this disclosure. Similarly the term “collection plate” or “electrically charged collection plate” refer to the same components and can be used interchangeably.

The term “about” is used in conjunction with numeric values to include normal variations in measurements as expected by persons skilled in the art, and is understood to have the same meaning as “approximately” and to cover a typical margin of error, such as ±15%, ±10%, ±5%, ±1%, ±0.5%, or even ±0.1% of the stated value. The term “about” also encompasses amounts that differ due to different equilibrium conditions for a composition resulting from a particular initial composition. Whether or not modified by the term “about,” the claims include equivalents to the quantities.

It should be noted that, as used in this specification and the appended claims, the singular forms “a,” “an,” and “the” include plural referents unless the content clearly dictates otherwise. Thus, for example, reference to a composition containing “a compound” includes having two or more compounds that are either the same or different from each other. By way of another example, “a processor” programmed to perform various functions refers to one processor programmed to perform each and every function, or more than one processor collectively programmed to perform each of the various functions.

It should also be noted that the term “or” is generally employed in its sense including “and/or” unless the content clearly dictates otherwise. As used herein, “and/or” refers to and encompasses any and all possible combinations of one or more of the associated listed items, as well as the lack of combinations when interpreted in the alternative (“or”).

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5:1-4:1-3:1-2:2-5:2-4:2-3:3-5:3-4; and 4-5.

The term “substantially” is utilized herein to represent the inherent degree of uncertainty that can be attributed to any quantitative comparison, value, measurement, or other representation. The term “substantially” is also utilized herein to represent the degree by which a quantitative representation can vary from a stated reference without resulting in a change in the basic function of the subject matter at issue.

The term “comprise,” “comprises,” and “comprising” as used herein, specify the presence of the stated features, integers, steps, operations, elements, and/or components, but do not preclude the presence or addition of one or more other features, integers, steps, operations, elements, components, and/or groups thereof.

As used herein, the transitional phrase “consisting essentially of” means that the scope of a claim is to be interpreted to encompass the specified materials or steps recited in the claim and those that do not materially affect the basic and novel characteristic(s) of the claimed invention. Thus, the term “consisting essentially of” when used in a claim of this invention is not intended to be interpreted to be equivalent to “comprising.”

The terms “preferred” and “preferably” refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

As used throughout this description, and in the claims, a list of items joined by the term “at least one of” or “one or more of” can mean any combination of the listed terms. For example, the phrase “at least one of X, Y or Z” can mean X: Y: Z; X and Y: X and Z; Y and Z: or X, Y and Z.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

The present disclosure is directed to a tire particulate collection device for a motor vehicle. Various embodiments of the devices disclosed herein overcome current design drawbacks of existing solutions, such as unwanted particulate build-up on collection plates. Furthermore, the embodiments disclosed provide devices and means for long-term in-vehicle storage solution system which remains unresolved in the current market.

Figure 1:
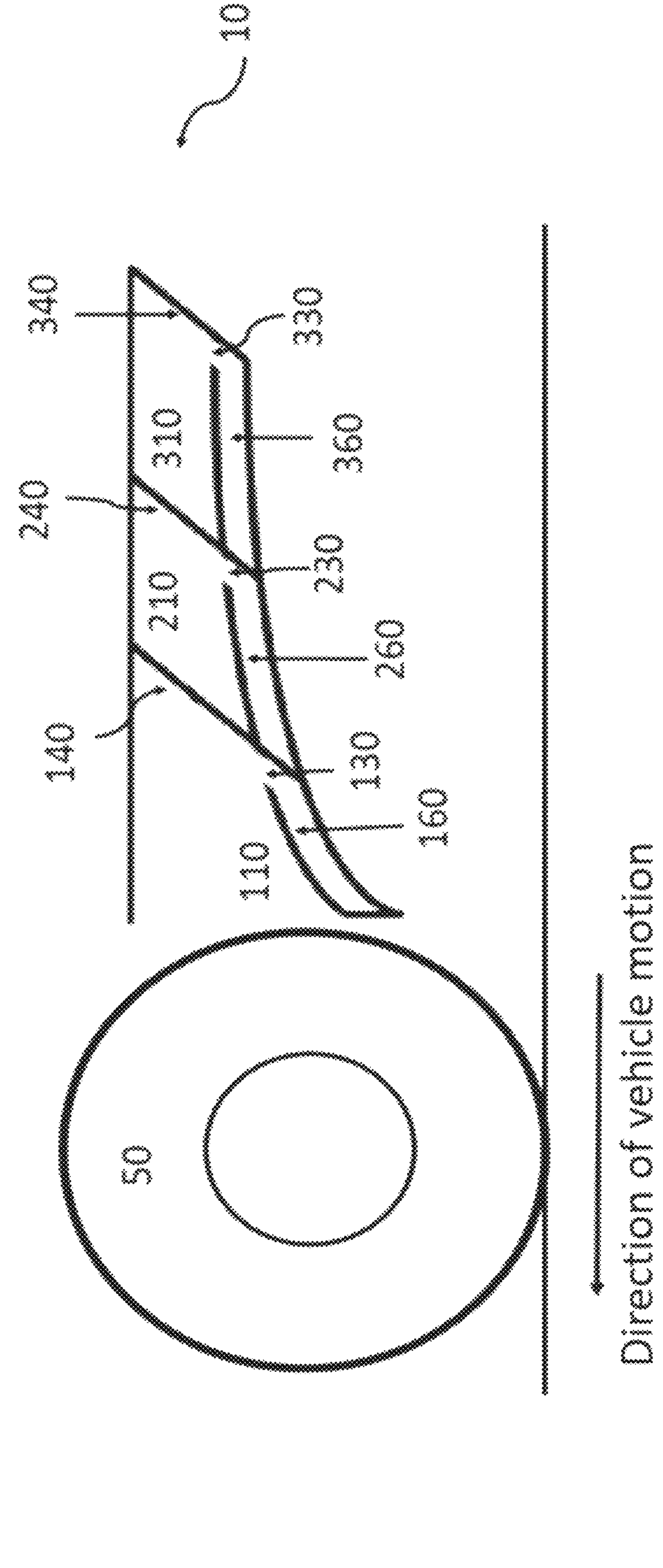
FIG. 1 depicts a cross-sectional view of a tire particulate collection device for a motor vehicle, according to embodiments disclosed herein.

As can be seen in FIG. 1, a tire particulate collection device 10 is shown. The device 10 is placed in proximity to a vehicle tire 50. The device 10 comprises at least a first chamber 110. The first chamber 110 includes a first grate 140, a first collection compartment 160, where tire particulate or other debris are collected. The first collection compartment 160 has a first opening section 130, which allows for tire particulate or debris to enter to ultimately be collected in the first collection compartment 160. The device 10 further comprises a last chamber 310, having a collection plate 340. The last chamber 310 also has a last collection compartment 360, with a last opening section 330, which allows entry of tire particulate matter into the last collection compartment 360.

During operation of the motor vehicle electrically charged particulate matter is discharged or accelerated from the moving tire. This particulate matter enters and is accelerated through the device, aided in its acceleration by the electric field created due to an applied electrical charge on the grate 140 and/or collection plate 340 of the device 10. The particulate matter is then collected within the device at least in the first collection compartment 160, or the last collection compartment 360.

In some embodiments, the device 10 may have more than one electrically chargeable grate, such as in the embodiment shown in FIG. 1. This embodiment utilizes a first grate 140, and second grate 240 and a collection plate 340. A second chamber 210 is present, having a second collection compartment 260, with a second opening section 230.

As charged particulates are discharged from the tire 50 and accelerated through the first chamber 110 of device 10, they are filtered through the first grate 140, which has a specific filter grid, larger than a filter grid of the second grate 240. Particulate matter or debris that is too large to pass through the first grate 140, will drop down to the first collection compartment 160, through the first opening section 130. For particulate matter which is smaller and passes through the filter grid of grate 140, it will continue to accelerate to the second chamber 210 and either be collected at the electrically charged second grate 240, where it will either be too large to pass through the filter grid of grate 240, or it will be smaller than the filter grid and accelerate further to the last chamber 310 and be ultimately electrically attracted to the collection plate 340.

Therefore, it follows that the particulate matter or debris which is collected in the first collection compartment 160, is larger than the particulate matter collected in the second collection compartment 260 and the last collection compartment 360. Similarly, the particulates which will be capable of collection in the last collection compartment 360 will be smaller than those in the preceding collection compartments 260 and 160.

Figure 2:
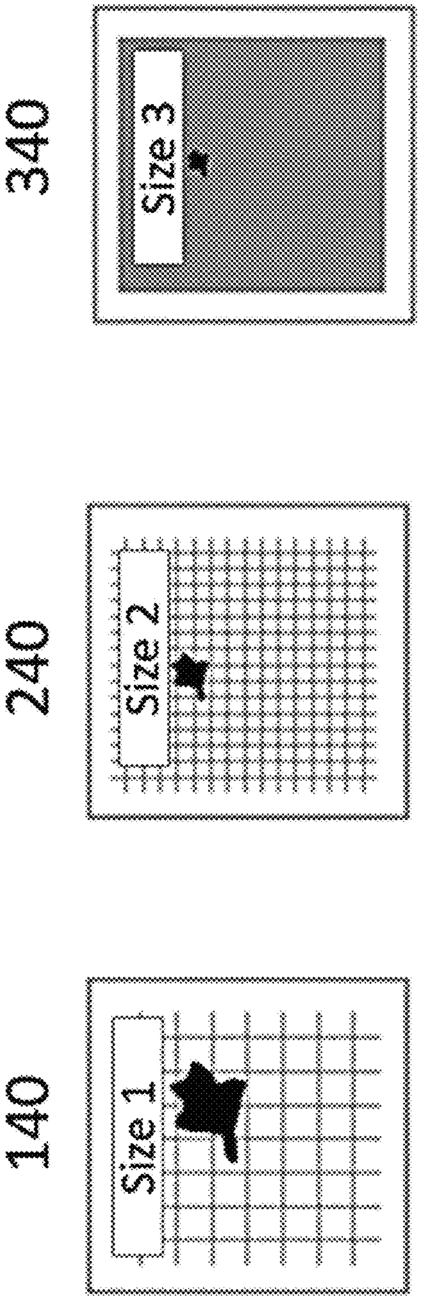
FIG. 2 depicts a front view of electrically charged grates and collection plates used in the devices of the present invention, according to embodiments disclosed herein.

The respective filter grids of grates 140, 240 and 340, and their relative size are shown in FIG. 2. The collection plate 340, in one embodiment does not have a filter grid, as it is incorporated in the last collection chamber and will be the final section of the device 10 where particulates will be collected. The collection plate 340 is therefore a solid surface, which is comprised of material that is capable of being electrically charged through a supplied voltage. In one embodiment, the filter grid of grate 140 can have grid openings which will allow particulates of about 100 to 2000 micrometers in size to pass. The second filter grid of grate 240 will have smaller allowances, for particulates of about 50 to 100 micrometers in size. Smaller particulates, (anything smaller than 50 micrometers) if not collected in the first or second grate will pass through and be collected in the last collection plate 340. The grates 140, 240 and collection plate 340 will preferably be at least partially comprised of a metallic material, or other known materials capable of conducting a current, so that they can be appropriately charged for operation in device 10. Additionally, at least the first grate 140 should be comprised of mechanically sturdy material, so that it can withstand the potential impact of projectile debris from larger sediment, without incurring structural damage.

In certain embodiments, the device 10 comprises a first chamber 110 with a first grate140. In other embodiments, the device 10 can comprise a second chamber 210 with a second grate 240, as shown in the embodiment depicted in FIG. 1. A third grate (not shown) may be incorporated in further embodiments, depending on the desired filtration and of particulate sorting for that vehicle or tire type. The last chamber 310 having the collection plate 340 will be present in all embodiments disclosed herein.

Figure 3:
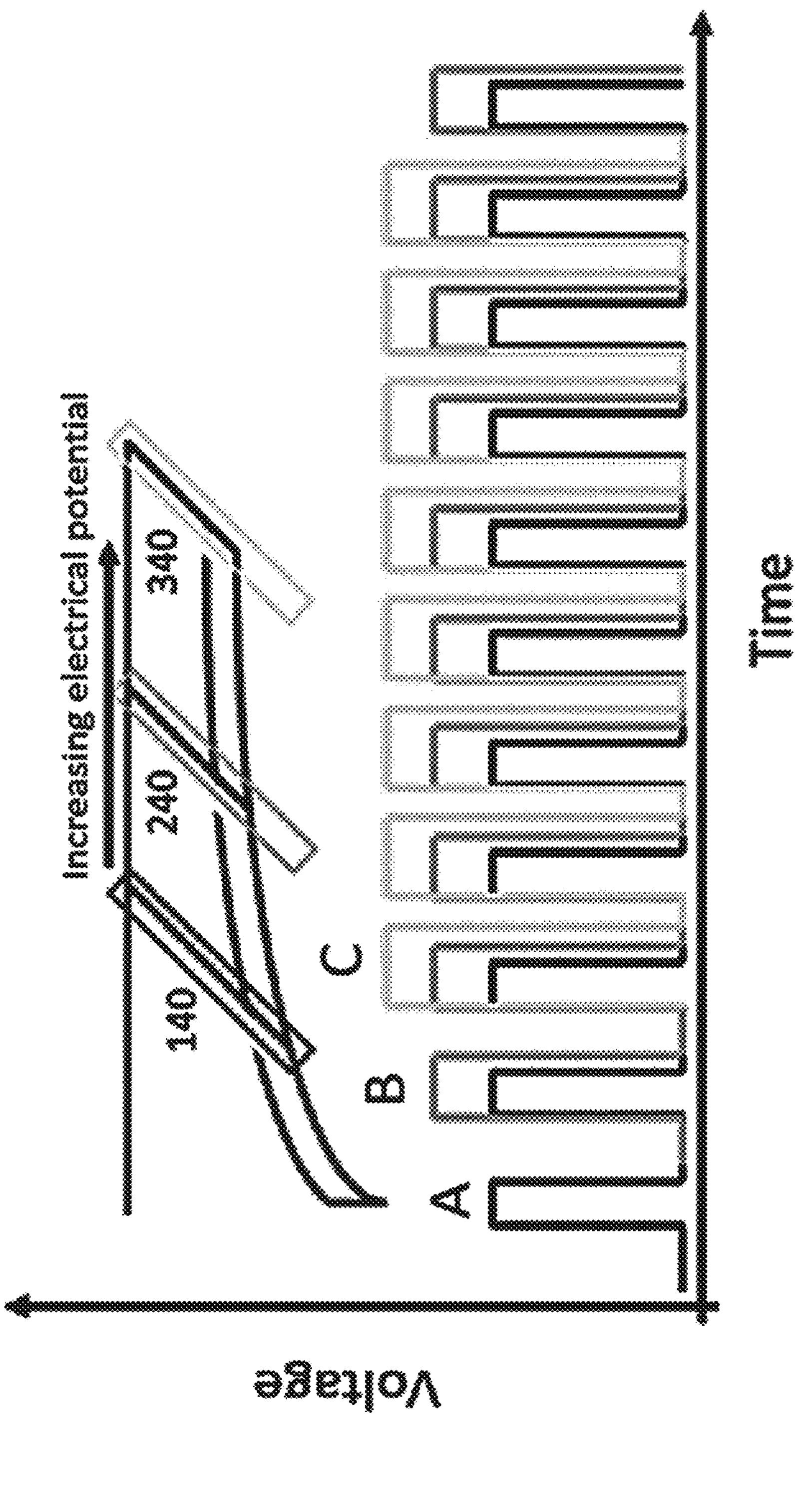
FIG. 3 is a graphical depiction of the applied pulsed staggered voltage as a function of time, in the tire particulate collection device of the present invention, according to embodiments disclosed herein.

The means of how particulate matter is accelerated through the various chambers of device 10 will now be described in more detail. Referring now to FIG. 3, it can be seen that the device 10 utilizes a pulsed voltage that is supplied to the first grate 140, the second grate 240, and the collection plate 340. The description in this section will follow the embodiment of the device shown in FIG. 2 which has three chambers, although the application of the pulsed voltage is utilized in the same manner in other embodiments (having less or having more chambers).

A first pulsed voltage A is supplied to the first grate 140. A second pulsed voltage B is supplied to the second grate 240. A third pulsed voltage C is supplied to the collection plate 340. Voltage A is lower in amplitude than voltages B and C, and voltage B is lower than voltage C. Therefore, an increasing pulsed voltage is supplied to the grates and collection plate as the particulate matter travels from an entry portion of device 10 to the back end portion of device 10. As can be seen in FIG. 3, the pulsed voltage applied to the first grate 140, the second grate 240 and collection plate 340 is a staggered pulsed voltage, which is described below The voltages, A B and C, supplied to each component described here are operated with an active phase and an inactive phase. During an active phase a voltage is supplied to each grate so as to provide an electrical charge and conversely during the inactive phase the voltage ceases (is removed) so as to deactivate the grate and remove any electric charge. During operation of the device 10, a voltage supplied during an active phase, by creating an electric field aids the electrically charged particulate matter to be accelerated toward the first electrically charged grate 140. During the inactive phase of the pulsed voltage, when the voltage is removed, the electrical charge of the grate 140 ceases and any particulate matter attracted or caught on the grate 140 will slide down to the collection compartment 160. The same concept of active and inactive phases of pulsed voltage applies to the other electrically charged grates and/or collection plate of the device. In other embodiments, the voltage may vary continuously with an AC sinusoidal phase (not depicted in Figures). In these embodiments, the inactive phase can comprise a negative voltage, oppositely charged to the particulate matter, to facilitate movement of the particulate matter from the grates and into the collection compartment.

In some embodiments, staggering the pulsed voltage is an important operating feature of device 10. By staggering the time of when voltage pulses are applied to grate 140, 240 and collection plate 340, the particulate matter can be accelerated through the various chambers of the device all the way to the collection plate 340. For example, when grate 140 is in an inactive phase of the voltage pulse and no electrical charge is supplied during that time, the second grate 240 should be in an active phase, so that particulate matter can continue to be accelerated to the second grate 240, even while grate 140 is not electrically charged. Similarly with the collection plate 340, when a second grate 240 is in an inactive phase and no longer electrically charged, the collector plate 340 should be in an active phase of the voltage pulse so as to continue to attract and collect particulate matter, which is sized to pass through the first filter and second filter grids. It is important to note that the use of an inactive phase is essential to operation of the device 10, to prevent built-up of particulate matter on the grates. If this build-up of particulate matter is allowed to proceed (i.e. resulting in blockages on the grates) it would ultimately result in reduction of the electric field and would diminish the effectiveness of the grates to filter particulates of various sizes. Additionally, the onset time, off time, and duration (frequency) of pulsed voltages A, B, and C do not have to be the same.

In one embodiment, the operating voltage and pulse are designed to match that of the motor and/or electronics of the vehicle. In a non-limiting example, if the onboard vehicle motor operates at 5K RPM (83 Hz) and 400 V, then the voltage values of A, B, and C may be within 10-100% of that range, meaning the applied voltages for pulses A, B and C are in the range of 40 V to 400 V. The main governing principle, as noted in the graph of FIG. 3 is that the applied voltage A, should be less than B, and the applied voltage B should be less than C, (i.e. $A<B<C$).

In another embodiment, the operating voltage and pulse are designed to match the optimal tire particulate collection specification. In a non-limiting example, a 10 kV charge may collect the maximum amount particulate matter, and a pulse length of 2 seconds (0.5 Hz) may maximize the particulate matter that is gravitationally accelerated into grates 140, 240, and collection plate 340.

In embodiments, the staggered pulsed voltage which is applied to the first grate 140, the second grate 240, or the collection plate 340, is in the range of 0.3 to 30 kV. As will be understood by those of skill in the art, the applied voltage, duration of pulse onset time and off time, and the frequency of the pulses for all the electrically chargeable components can be varied to achieve specific collection objectives for that particular vehicle type or tire type.

In some embodiments, the device 10 is in appropriate proximity with the tire 50. Multiple devices 10 are positioned in proximity of each tire of a motor vehicle. For example, in one embodiment, a device 10 is placed within a distance of 5 cm to 25 cm behind a tire of the motor vehicle and securely coupled to the body of the motor vehicle.

A central particulate storage system (not shown) can be coupled to multiple devices, one per tire, wherein the particulate matter collected in each device is then stored in the central particulate storage system of a vehicle as a means of a longer term storage. This will allow for collection of the particulate matter, during routine maintenance procedures for vehicles, without the need to frequently service/empty each device 10. A means for extracting the particulate matter from the various devices and into the central storage system is also included. Such means can include mechanical suction, coupled to each device, which aids in removal of the particulate matter from the devices and routing to the central storage system of the vehicle. The various channels, connection sections, or compartments of the central storage system can comprise a plurality of gravity traps throughout, which can prevent and backward flow or movement of particulate matter towards the tire during operation or non-operational times of the vehicle. Gravity traps can comprise any internal configuration within and throughout the central storage system (e.g., steps configuration), which is capable of prevent backflow of particulates and other debris, collected by device 10.

The device of claim 10 further comprises an electrical or voltage supply source. The electrical supply source is configured to supply a voltage to each of the various components of the device which will require an electrical charge for operation of the device.

Figure 4:
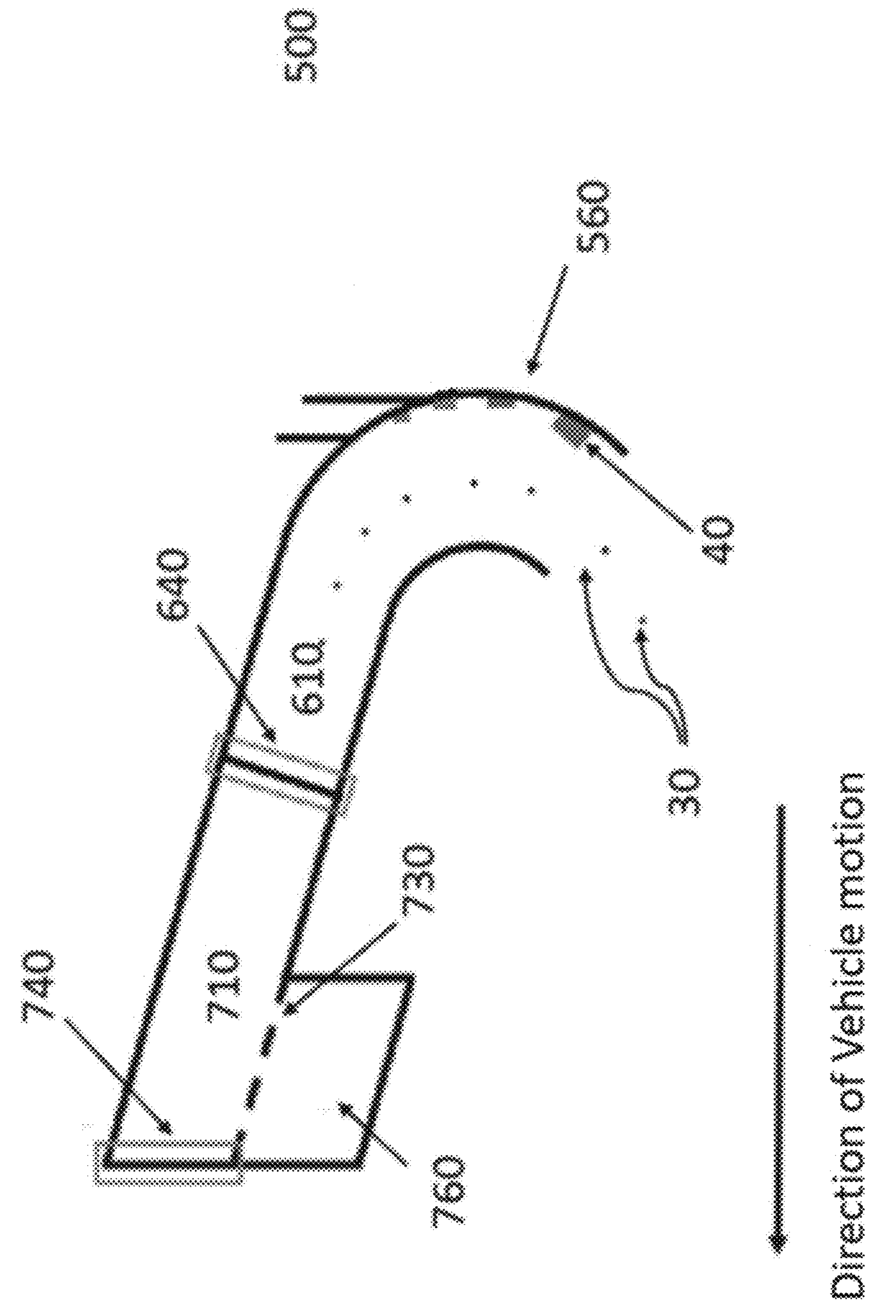
FIG. 4 depicts a cross-sectional view of a tire particulate collection device for a motor vehicle, according to embodiments disclosed herein.

Shown in FIG. 4 is a further embodiment of the devices disclosed herein, according to the present invention. In this embodiment, a tire particulate collection device 500 is shown for use in motor vehicle. The device 500 is placed in proximity to a vehicle tire so that electrically charged tire particulate matter is accelerated towards an entry section of device 500. The device 500 comprises at least a first chamber 610. The first chamber 610 includes a first grate 640, and a curved collection wall 560. The device 500 further comprises a last chamber 710, having a collection plate 740. The last chamber 710 has a last collection compartment 760, with a last opening section 730, which allows entry of tire particulate matter into the last collection compartment 760.

During vehicle operation, electrically charged tire particulate matter 30 is accelerated into a first chamber 610 of the device 500. Other larger debris 40 either from the road or collected onto the tires can also enter the chamber 610. The curvature of the wall 560 allows for blocking the trajectory of this larger debris, into the first chamber 610, while other electrically charged smaller tire particulate matter is accelerated through the chamber 610 due to the electrically charged first grate 640 which induces an electrical field. The debris which can be collected and blocked from further entering the first chamber 610 includes soil, wet sediment, rocks, salt deposited on the roadways, or other large particulates, including rubber from the tires, which can be accelerated from movement of the tire and contact of the tire with the road surface. In one embodiment, the acceleration of particulate matter throughout the curved first chamber 610 is provided by charging grate 640. In another embodiment, a separate electrode is located in closer proximity to the curvature of the first chamber 610, containing a positive or negative charge to accelerate particulate matter within the curved first chamber 610. The debris 40 will detach and drop from the curved wall 560 aided by downward gravitation force, and be released on the roadway. Any remaining particulates on the curved wall 560 can be removed and routinely cleaned during normal servicing of the motor vehicle. In another embodiment, the device 500 can be designed with apertures that allow it to be rinsed whenever water is applied to the exterior (e.g. rain, car wash). These apertures can be located on the external curved wall 560 and will allow for entry of water into portions of the first chamber 610.

The staggered pulse voltage disclosed and described for the operation of the embodiments of FIG. 1-3, is also applied in the same manner to the device 500 of the presently described embodiment. Therefore, a staggered pulsed voltage A, can be applied to grate 610, and a pulsed voltage B applied to collection plate 740. Voltage A is lower than voltage B, and operates in the same staggered manner as described in the sections and embodiments above. In this embodiment, the first chamber 610 may or may not have a collection compartment (as in the prior embodiments), since at least some of the debris is gravitationally released downwards through the chamber or is caught on the interior curved wall 560. In further embodiments, a second or third or more grates (not shown) can be incorporated in device 500, depending on the desired filtering, sorting and collection design of the device.

In all embodiments disclosed herein, by including a plurality of chambers and electrically chargeable grates, with varying filter grids, allows for sequestration and sorting of multiple sizes of tire particulates. Certain microplastics of a specific size will be confined in specific collection compartments and can be recycled or used in other processes as desired. Thus, the design of the present embodiments now only allow for collection of tire particulates, but also for sorting (based on size) of various tire particulates and ultimately recycling or repurposing of these particulates once they are collected from the device, or central particulate storage system of the motor vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A tire particulate collection device for a motor vehicle, comprising:

at least a first chamber, wherein the first chamber comprises:

a first grate; and a first collection compartment;

a second chamber comprising a second grate and a second collection compartment, positioned between the first chamber and a last chamber; and wherein the last chamber comprises:

a collection plate; and a last collection compartment;

wherein electrically charged particulate matter is accelerated within the device while the motor vehicle is in motion, and is collected within the device at least in the first collection compartment or the last collection compartment.

2. The device of claim 1, wherein the first grate comprises a first filtration grid and the second grate comprises a second filtration grid, wherein the first filtration grid is larger than the second filtration grid.

3. The device of claim 1, wherein the particulate matter collected at the first collection compartment is larger than the particulate matter collected at the second collection compartment.

4. The device of claim 1, wherein a pulsed voltage is applied to the first grate and the collection plate.

5. The device of claim 4, wherein the pulsed voltage applied to the first grate and the collection plate is a staggered pulsed voltage.

6. The device of claim 1, wherein the first grate and the collection plate are operated in an active phase and inactive phase;

wherein the active phase comprises supplying a voltage to provide an electrical charge and the inactive phase comprises removing at least some of the voltage to remove the electrical charge.

7. The device of claim 6, wherein during the active phase, particulate matter is accelerated toward the first grate or collection plate, and during the inactive phase, electrically charged particulate matter is deposited in the first collection compartment or last collection compartment.

8. The device of claim 1, wherein a staggered pulsed voltage is applied to the first grate and the collection plate, wherein the staggered pulsed voltage is about 0.3 to 30 kV.

9. The device of claim 1, wherein the device is positioned within a distance of 5 cm to 25 cm of a tire of the motor vehicle and securely coupled to the body of the motor vehicle.

10. The device of claim 1, wherein the first grate and the collection plate are coupled to a voltage supply source.

11. A tire particulate collection device for a motor vehicle, comprising:

at least a first chamber, wherein the first chamber comprises:

a curved collection wall; and a first grate;

a second chamber having a second grate and a second collection compartment, positioned between the first chamber and a last chamber; and wherein the last chamber comprises:

a collection plate; and a last collection compartment;

wherein particulate matter is accelerated within the device while the motor vehicle is in motion, and is collected within the device at least in the last collection compartment.

12. The device of claim 11, wherein the first grate comprises a first filtration grid and the second grate comprises a second filtration grid, wherein the first filtration grid is larger than the second filtration grid.

13. The device of claim 11, wherein a pulsed voltage is applied to the first grate and the collection plate.

14. The device of claim 13, wherein the pulsed voltage applied to the first grate and the collection plate is a staggered pulsed voltage.

15. The device of claim 11, wherein the first grate and the collection plate are operated in an active phase and inactive phase, wherein the active phase comprises supplying a voltage to provide an electrical charge and the inactive phase comprises removing at least some of the voltage to remove the electrical charge.

16. The device of claim 15, wherein during the active phase, particulate matter is accelerated toward the first grate or collection plate, and during the inactive phase, particulate matter is deposited in the first collection compartment or last collection compartment.

17. A tire particulate collection device for a motor vehicle, comprising:

at least a first chamber, wherein the first chamber comprises:

a first grate; and a last chamber, wherein the last chamber comprises:

a collection plate; and a last collection compartment;

wherein a staggered pulsed voltage is applied to the first grate and the collection plate, and wherein the pulsed voltage applied to the first grate is less than the pulsed voltage applied to the collection plate, and wherein electrically charged particulate matter is accelerated within the device while the motor vehicle is in motion.

* * * * *